US007292926B2

(12) United States Patent
Schmidt et al.

(10) Patent No.: US 7,292,926 B2
(45) Date of Patent: Nov. 6, 2007

(54) METHOD AND DEVICE FOR ESTIMATION OF COMBUSTION CHAMBER PRESSURE

(75) Inventors: Thorsten Schmidt, Braunschweig (DE); Winfried Schultalbers, Meinersen (DE); Henning Rasche, Galmersholm (DE); Hermann Fehrenbach, Rutzheim (DE); Joachim Scheu, Bad Wimpfen (DE)

(73) Assignee: Audi AG (DE)

( * ) Notice: Subject to any disclaimer, the term of this patent is extended or adjusted under 35 U.S.C. 154(b) by 64 days.

(21) Appl. No.: 10/536,557

(22) PCT Filed: Nov. 5, 2003

(86) PCT No.: PCT/EP03/12316

§ 371 (c)(1),
(2), (4) Date: Mar. 8, 2006

(87) PCT Pub. No.: WO2004/051064

PCT Pub. Date: Jun. 17, 2004

(65) Prior Publication Data

US 2006/0196173 A1 Sep. 7, 2006

(30) Foreign Application Priority Data

Nov. 29, 2002 (DE) ................................ 102 56 107

(51) Int. Cl.
*G01F 19/00* (2006.01)
*G01L 23/22* (2006.01)

(52) U.S. Cl. ...................... 701/101; 701/114; 73/35.12

(58) Field of Classification Search ................ 701/101, 701/114, 115; 73/35.01, 35.04, 35.12
See application file for complete search history.

(56) References Cited

U.S. PATENT DOCUMENTS 5,722,519 A * 3/1998 Kirchhoffer et al. ......... 192/3.3
5,884,602 A * 3/1999 Friedrich et al. ........... 123/300
6,336,070 B1 * 1/2002 Lorenz et al. .............. 701/102
6,714,852 B1 * 3/2004 Lorenz et al. .............. 701/102
7,013,862 B2 * 3/2006 Gerhardt ..................... 123/295

FOREIGN PATENT DOCUMENTS

DE 195 04 098 A1 2/1995
DE 199 00 738 1/1999
GB 2 331 154 A 5/1999
JP 63 248 954 10/1988
WO WO 02/071308 9/2002

OTHER PUBLICATIONS

Dr. -Ing Hermann Fehrenbach et al; Bestimmung des Motordrehmoments aus dem Drehzahlsignal, Dec. 2002; pp. 1020-1027.
M. Kahn; Object Oriented Modeling of a System for Automated Vehicle Guidance, Jan. 2001; pp. 58-59.

* cited by examiner

*Primary Examiner*—John T. Kwon
(74) *Attorney, Agent, or Firm*—Stevens, Davis, Miller & Mosher, LLP

(57) ABSTRACT

It is claimed that statements regarding cylinder pressure are obtained for optimization of the combustion process in internal combustion engines. The internal combustion engine is modeled with a plurality of model parameters (1 to 5) for this purpose. Once it has been acquired, a model alternating torque (MW) is compared to an actual alternating torque (IW). The model parameters are modified in accordance with the result of the comparison. The model yields realistic values of the combustion chamber value on the basis of the modified model parameters.

12 Claims, 1 Drawing Sheet

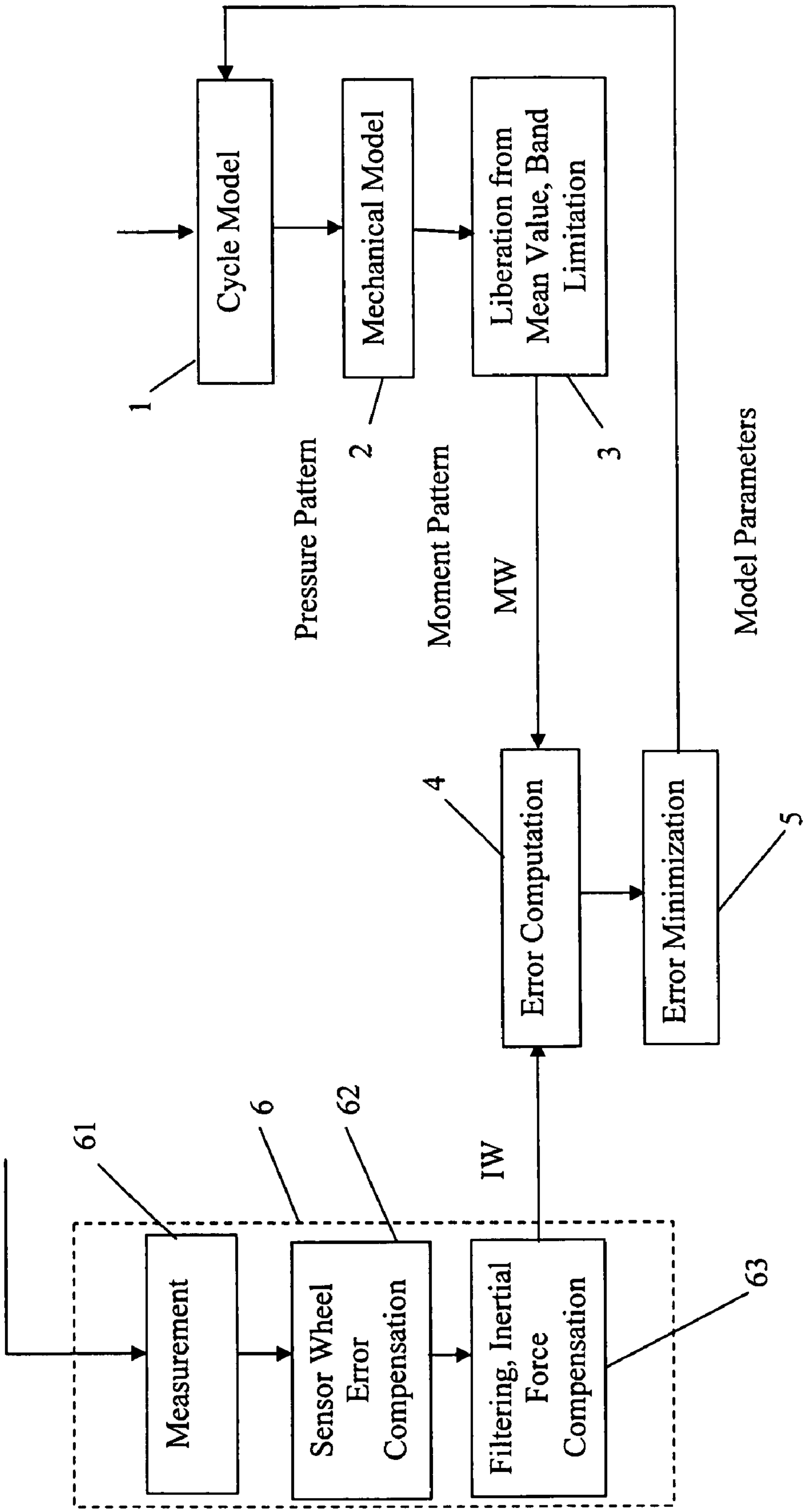
Cycle Model
Mechanical Model
Liberation from Mean Value, Band Limitation
1
2
3
Pressure Pattern
Moment Pattern
MW
Model Parameters
Error Computation
Error Minimization
4
5
Measurement
Sensor Wheel Error Compensation
Filtering, Inertial Force Compensation
61
6
62
63
IW

METHOD AND DEVICE FOR ESTIMATION OF COMBUSTION CHAMBER PRESSURE

This application is a § 371 application of PCT/EP03/12316, which claims priority from DE 10256107.9, filed Nov. 29, 2002.

BACKGROUND

This invention relates to a method for estimation of combustion chamber pressure of an internal combustion engine and to a device to be used for this purpose.

SUMMARY OF THE INVENTION

Combustion chamber pressure is often used as a decisive quantity for describing processes in a combustion chamber of an internal combustion engine. Knowledge of combustion may be used for engine control in order to optimize the combustion process. The parameters of the combustion process such as time of ignition and valve control may accordingly be set by engine control unit.

Combustion chamber pressure may be determined by means of a pressure sensor. Sensors such as this are not cost-effective either in manufacture or installation or in maintenance because of the decidedly high pressures to be measured. This disadvantage is even greater in internal combustion engines with a large number of cylinders.

The object of this invention accordingly is to acquire data on the combustion process in the individual combustion chambers of an internal combustion engine.

The invention that is attained by means of a method for estimating the combustion chamber pressure of an internal combustion engine by constructing a model of the internal combustion engine with several model parameters in one model including provision of a combustion chamber pressure value and a model alternating torque, determination of actual alternating torque, adjustment of the model alternating torque to the actual alternating torque accompanied by modification of the model parameters, and determination of an estimated value of the combustion chamber pressure in relation to the model on the basis of the modified model parameters.

The invention includes a device for estimating combustion chamber pressure of an internal combustion engine with a computer system for modeling the internal combustion engine with several model parameters in a model by establishing a combustion chamber pressure value and a model alternating torque, a data acquisition system connected to the computer system for acquiring an actual alternating torque, the computer unit ensuring that the model alternating torque may be adjusted to the actual alternating torque by modifying the model parameters and that an estimated value of the combustion chamber pressure in relation to the model may be determined on the basis of the modified model parameters.

The invention makes it possible to obtain statements regarding energy conversion in each cylinder. It is an advantage that a characteristic diagram with a plurality of parameters need not be plotted for each cylinder in advance in order to obtain data concerning the combustion process for a current run. The model rather makes it possible to obtain realistic parameters for the cycle and thus to effect pollutant or fuel minimization, for example.

The model claimed for the invention makes it possible to obtain statements regarding energy conversion in each cylinder. It is an advantage that a characteristic diagram with a plurality of parameters need not be plotted for each cylinder in advance in order to obtain data concerning the combustion process for a current run. The model rather makes it possible to obtain realistic parameters for the cycle and thus to effect pollutant or fuel minimization, for example.

By preference a cycle model for description of combustion in a combustion chamber is obtained in the model. Suitable cycle models have long been known and permit simulation of virtually any combustion process with a plurality of parameters.

In addition, the model may comprise a mechanical model for description of a spring-mass system of the internal combustion engine. This makes it possible to take into account the individual mechanism of an internal combustion engine for generation of torque.

Band limitation may be provided for obtaining model alternating torque. Such band limitation makes it possible both to filter out the constant portion and minimize any disturbances in the high-frequency range.

By preference adjustment of the model alternating torque and the actual alternating torque by error calculation and reduction of the error below a prescribed limit value is effected by means of the model parameters through a control circuit. Automatic model validation is effected by means of this control circuit. However, it is also possible to determine optimized model parameters from the difference between the model alternating torque and the actual alternating torque by means of a single computer step, which is also termed a one-step method.

The actual alternating torque may be an estimated value that has been determined by means of an instantaneous estimation model. The actual alternating torque may also be determined metrologically, as was indicated in the introduction.

BRIEF DESCRIPTION OF THE DRAWINGS

The present invention will be described in detail below with reference to the attached drawing, which is in the form of a block diagram of connections of the model claimed for the invention for estimating cylinder pressure. The exemplary diagrams described below represent preferred embodiments of the present invention.

DETAILED DESCRIPTION OF THE INVENTION

The basis of cylinder pressure estimation is represented by comparison of an actually measured or estimated actual alternating torque IW to a model alternating torque MW, which is determined by a suitable model. In the illustration the model is presented as a control loop on the right side. The model is made up essentially of a cycle model 1 and a mechanical model 2. As is indicated by the arrow pointing downward in the illustration, initial values such as those for engine temperature, ignition timing, and the like are first adopted as approximate reference values for current operating values of the engine from engine control. On the basis of these input parameters the cycle model 1 calculates a pressure pattern in the individual internal combustion chambers of the various cylinders.

The mechanical model 2 employs the pressure patterns as determined in the individual cylinders in order to generate a moment pattern of the crankshaft from them. For this purpose the spring-mass system of the internal combustion engine is taken into consideration. In particular torque is computed with a constant portion and an alternating portion.

The alternating portion contains torsion moments such as those of the crankshaft and inertia moments of rotating or oscillating masses such as crankshaft, connecting rod, and the like.

The moment pattern obtained from the mechanical model 2 is subjected in block 3 to band limitation. This serves the purpose in particular of achieving freedom from a mean value, that is, freeing of the moment pattern from the constant moment. In addition, the band limitation also eliminates higher residual frequencies, so that the signal-to-noise ratio of the useful remaining signal increases. The output signal of block 3 accordingly is a disturbance-reduced model alternating torque MW.

In block 4 this model alternating torque MW is compared to an actual alternating torque and a corresponding error is determined and prepared as output signal. By preference the root mean square error is employed as the error.

An attempt is made in block 5 to minimize this error. The error is for this purpose compared to an assigned limit value. If the error is larger than the limit value, one or more of the model parameters is/are modified for the cycle model 1. If the root mean square error is smaller than the prescribed limit value, the optimum desired has been reached and the model parameters of the cycle model 1 may be regarded as realistic for the current combustion process.

The optimal model parameters are here found iteratively in a control loop. However, a one-step process involving more extensive use of computational means may also be applied in this instance for the purpose.

The manner in which the actual alternating torque IW is determined is illustrated in the left-hand portion of the drawing. This is effected in this instance by means of a moment estimating process. The model used for this purpose is indicated symbolically by block 6. An engine speed signal obtained by periodic continuous measurement 61 first undergoes sensor wheel error compensation or sensor wheel compensation 62. The sensor wheel error need be memorized only once in advance for each engine and then stored. Subsequent processing by digital filtering and inertial force compensation 63 results in the desired actual alternating torque IW.

Estimation of the actual alternating torque may also be replaced by direct measurement of this quantity. However, out of consideration of costs a sensor system generally is not built into mass-produced vehicles.

It may be said in summary, then, that evaluation of the torque signal for estimating cylinder pressure analyzed on the basis of the crank angle may be employed for estimating cylinder pressure. The cylinder pressure estimation made in this manner smoothes the way to cylinder-selective engine management based on engine speed without costly cylinder pressure sensors. Cylinder misfire recognition may be cited as a typical application. The engine data acquired may also be employed for motor vehicle safety planning purposes.

The invention claimed is:

1. A method for estimation of combustion chamber pressure of an internal combustion engine, comprising:

modeling of the internal combustion engine with a plurality of model parameters in a model by providing a combustion chamber pressure value and a model alternating torque, acquiring an actual alternating torque value, adjusting the model alternating torque to the actual alternating torque by modifying the model parameters, and determining an estimated value of the combustion chamber pressure in relation to the model on the basis of the modified model parameters.

2. The method as claimed in claim 1, wherein the modeling comprises utilizing a cycle model for description of combustion in a combustion chamber, wherein initial values for the cycle model are taken from an engine control unit.

3. The method as claimed in claim 1, wherein the modeling comprises utilizing a mechanical model for description of a spring-mass system of the internal combustion engine.

4. The method as claimed in claim 1, wherein band limitation is effected in order to acquire the model alternating torque.

5. The method as claimed in claim 1, wherein the adjusting is effected by error calculation and reduction of the error below an assigned limit value in a control circuit by means of the model parameters.

6. The method as claimed in claim 1, wherein the actual alternating torque is an estimated value of a moment estimation model.

7. A device for estimating combustion chamber pressure of an internal combustion engine, comprising:

a computer system for modeling of the internal combustion engine having a plurality of model parameters in a model by providing a combustion chamber pressure value and a model alternating torque, an acquisition system connected to the computer system for acquiring an actual alternating torque, the model torque being subjected to adjustment to the actual alternating torque by the computer unit through modification of the model parameters and it being possible to determine an estimated value of the combustion chamber pressure in relation to the model on the basis of the modified model parameters.

8. The device as claimed in claim 7, wherein the model stored in the computer system comprises a cycle model for description of combustion in a combustion chamber, it being possible to acquire initial values in particular from an engine control unit.

9. The device as claimed in claim 7, wherein the model filed in the computer system comprises a mechanical model for description of a spring-mass system of the internal combustion engine.

10. The device as claimed in claim 7, further comprising a filter mechanism for band limitation for the purpose of acquisition of the model alternating torque from a moment pattern.

11. The device as claimed in claim 7, wherein adjustment of the model alternating torque by the actual alternating torque in the computer system may be effected by error calculation and reduction of an error below an assigned limit value in a control circuit by means of the model parameters.

12. The device as claimed in claim 7, wherein the acquisition mechanism for acquisition of the actual alternating torque has an additional computer system for estimating the actual alternating torque from a measured value in relation to an angular velocity of the internal combustion engine.

* * * * *